S. F. GOSS.
MIRROR LOCK.
APPLICATION FILED OCT. 6, 1915.
1,171,188.
Patented Feb. 8, 1916.
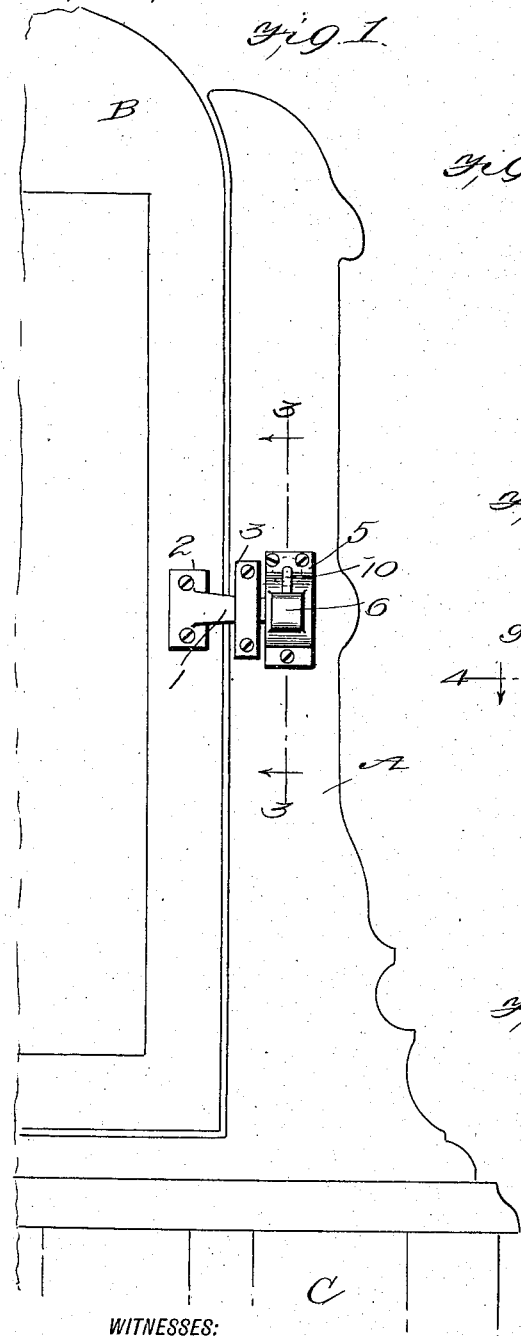
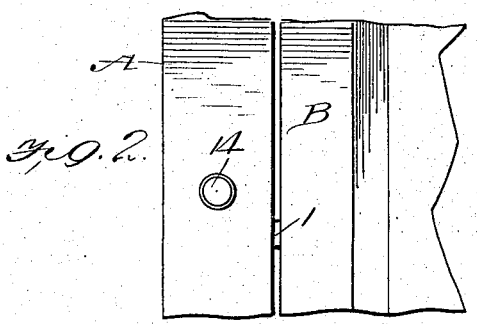
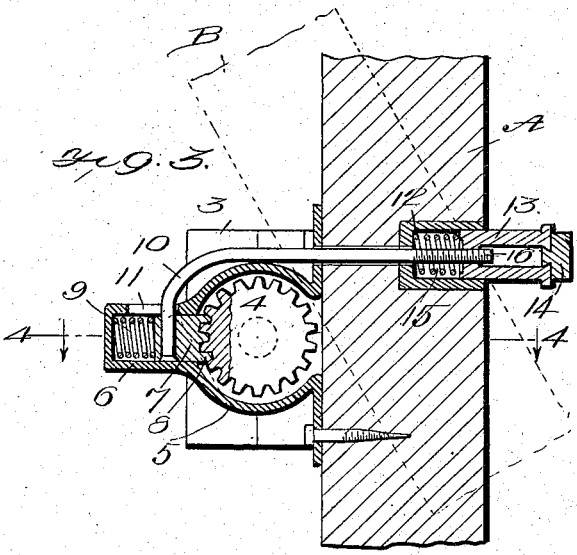
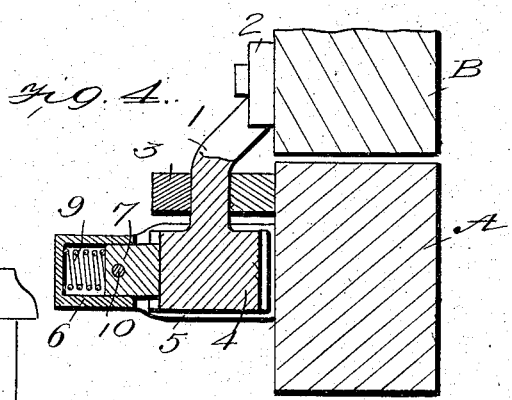
WITNESSES:
F. C. Barry
R. W. Smith
INVENTOR
Samuel F. Goss
BY Munn & Co
ATTORNEYS

UNITED STATES PATENT OFFICE.

SAMUEL F. GOSS, OF MOSIER, OREGON.

MIRROR-LOCK.

1,171,188.      Specification of Letters Patent.      Patented Feb. 8, 1916.

Application filed October 6, 1915. Serial No. 54,449.

*To all whom it may concern:*

Be it known that I, SAMUEL F. GOSS, a citizen of the United States, and a resident of Mosier, in the county of Wasco and State of Oregon, have invented a new and useful Improvement in Mirror-Locks, of which the following is a specification.

The main object of my invention is to provide a mirror lock adaptable to all styles of dressers having a swinging mirror, which will lock the mirror at any desired angle and which will be simple but positive in its operation.

A further object of my invention is to provide a device which will be inconspicuous upon the dresser frame, and so not detract from the appearance of the dresser.

My invention resides in the construction, combination, and arrangement of parts to be hereinafter described and claimed, and illustrated in the accompanying drawings forming a part of this specification in which like reference characters denote like parts.

Figure 1 is a rear view of a dresser having a swinging mirror with my improved lock in position. Fig. 2 is a fragmentary view of the front of a mirror and its supporting frame, showing the push button for operating the lock. Fig. 3 is a vertical section on the line 3—3 of Fig. 1. Fig. 4 is a horizontal section on the line 4—4 of Fig. 3.

In the drawings, C is a dresser of standard construction having the mirror B pivoted between the stationary frames A. A plate 2 secured to the rear of each side of the mirror frame near its center, has an offset laterally extending bearing pin 1 formed integral therewith which passes through a supporting bearing 3 secured to the stationary frame. The free end of the bearing pin is enlarged to form a toothed wheel 4 which is inclosed by a casing 5 secured to the supporting frame. This casing has a protuberance at its rear forming a slideway 6, in which is seated a block 7 have teeth 8 formed on the side adjacent the toothed wheel 4 and adapted to engage the same. A coil spring 9 is interposed between the block 7 and the rear of the slideway 6, to normally hold the block 7 in engagement with the toothed wheel 4 and so lock the mirror frame against rotation.

A rod 10 extends upwardly from the block 7, passing through a slot 11 in the top of the casing 5, and is then bent at right angles and projects through an opening in the stationary mirror supporting frame to the front of the dresser. A sleeve 12 surrounding the outer end of this rod is counter sunk into the face of the stationary frame. A hollow push pin 13 having an ornamental push button 14 on its outer end, is threaded onto the end of the rod 10 and a coiled spring 15 is interposed between the push pin and the rear of the sleeve 12 to normally project the push pin and the rod 10 outwardly.

The end of the rod 10 is screw threaded for a considerable distance as shown at 16, so that by screwing the push pin 13 onto the rod 10 to a greater or less extent, the length of the latter can be varied at will, thus adapting the device to dressers in which the mirror supporting frames are of different thicknesses. Pressure on the button 14, pushes the rod 10 back, thus releasing the block 7 from engagement with the wheel 4. The mirror frame is now free to be rotated to any desired angle, the pins 1 turning in the bearings 3. When the mirror is in the desired position, the push button 14 is released, and the block 7 by the action of springs 9 and 12 will again be forced into engagement with the wheel 4, and so lock the mirror at the desired angle.

It will thus be seen that I have provided a device which is simple but positive in its action, but which does not detract from the appearance of the dresser, the push button 14 being the only part of the device visible from the front of the dresser.

I claim:—

1. A lock for a frame pivotally mounted between stationary supports comprising a bearing pin secured to the frame, a bearing bracket for the said pin secured to the stationary support, a toothed wheel upon the end of the bearing pin, a casing surrounding the same and having a protuberance at its rear forming a slideway, a block mounted in the slideway and having teeth adapted to engage the toothed wheel, a spring interposed between the block and the rear of the slideway, a rod secured to the block and extending through the stationary support, a counter sunk sleeve in the face of the stationary support surrounding the said rod, a hollow push pin adjustably secured to the said rod, and a spring interposed between the push pin and the rear of the counter sunk sleeve.

2. A lock for a frame pivotally mounted between stationary supports comprising a bearing pin secured to the frame, a toothed wheel on the end of the said pin, a sliding toothed block carried by the stationary support and normally engaging the said wheel to lock it against rotation, and means for disengaging the wheel and the said block.

3. A lock for a pivotally mounted frame comprising a bearing pin secured to the frame, a toothed wheel upon the end of the bearing pin, a casing surrounding the same and having a protuberance at its rear forming a slideway, a block mounted in the slideway and having teeth adapted to engage the toothed wheel, a spring interposed between the block and the rear of the slideway, and means for disengaging the wheel and the block.

4. A lock for a pivotally mounted frame comprising a bearing pin secured to the frame, a toothed wheel on the end of the said pin, a sliding toothed block secured to the stationary support and normally engaging the said wheel to lock it against rotation, and an adjustable push rod secured to the said block and passing through the stationary support to disengage the block from the wheel.

5. A lock for a pivotally mounted frame comprising a bearing pin secured to the frame, a sliding locking block adapted to lock the said bearing pin against rotation, a rod secured to the said block and passing through the stationary support, a counter sunk sleeve in the face of the supporting frame surrounding the said rod, a hollow push pin adjustably secured to the said rod, and a spring interposed between the push pin and the rear of the counter sunk sleeve.

6. A lock for a frame pivotally mounted between stationary supports comprising a bearing pin secured to the frame and journaled in a bracket secured to the rear of the stationary support, a locking member secured to the rear of the said support adapted to lock the said bearing pin against rotation, and a spring retracted rod secured to the said locking member and passing through the stationary support adapted to disengage the locking member from the said pin.

SAMUEL F. GOSS.

Witnesses:
W. E. THORN,
P. L. ARTHUR.

Copies of this patent may be obtained for five cents each, by addressing the "Commissioner of Patents, Washington, D. C."